(12) United States Patent
Zapinski et al.

(10) Patent No.: US 7,055,884 B2
(45) Date of Patent: Jun. 6, 2006

(54) LOW-FRICTION SLEEVE INSERT FOR A VISOR BEARING

(75) Inventors: Mike J. Zapinski, Macomb Township, MI (US); Von Gallaher, Rochester, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/904,123

(22) Filed: Oct. 25, 2004

(65) Prior Publication Data

US 2006/0087148 A1 Apr. 27, 2006

(51) Int. Cl.
*B60J 3/02* (2006.01)
(52) U.S. Cl. .................. 296/97.11; 296/97.12
(58) Field of Classification Search ............... 296/97.1, 296/97.9, 97.11, 97.12, 97.13
See application file for complete search history.

(56) References Cited

U.S. PATENT DOCUMENTS

| 4,582,356 | A | | 4/1986 | Kaiser et al. |
| 4,921,300 | A | | 5/1990 | Lawassani et al. |
| 4,987,315 | A | | 1/1991 | Abu-Shumays et al. |
| 5,004,288 | A | | 4/1991 | Viertel et al. |
| 5,967,587 | A | * | 10/1999 | Collet et al. ............. 296/97.11 |
| 6,120,084 | A | * | 9/2000 | Wieczorek ................. 296/97.1 |
| 6,139,083 | A | | 10/2000 | Fischer et al. |
| 6,296,293 | B1 | * | 10/2001 | Peterson et al. ......... 296/97.11 |
| 6,830,279 | B1 | * | 12/2004 | Beaver ...................... 296/97.9 |
| 2001/0050493 | A1 | | 12/2001 | Welter |
| 2003/0160473 | A1 | * | 8/2003 | Tiesler ...................... 296/97.1 |
| 2004/0090080 | A1 | | 5/2004 | Yasuhara et al. |

* cited by examiner

*Primary Examiner*—Jason Morrow
(74) *Attorney, Agent, or Firm*—Earl J. LaFontaine

(57) ABSTRACT

A sleeve insert (14) has a one piece construction with a cylindrical portion (26) disposed within a hole (24) of a bearing member (12) for the visor assembly (10). The cylindrical portion (26) has an inner surface (32) with a substantially low coefficient of friction for rotating and sliding an arm member (16) of the visor assembly (10) through the sleeve insert (14).

17 Claims, 2 Drawing Sheets

LOW-FRICTION SLEEVE INSERT FOR A VISOR BEARING

TECHNICAL FIELD

The present invention relates generally to visor assemblies for automotive vehicles, and more particularly to a low-friction sleeve insert for a improving the operation of a visor bearing assembly.

BACKGROUND OF THE INVENTION

Visor assemblies for vehicles are well known. A typical visor assembly includes an arm member that is pivotally mounted to a vehicle headliner adjacent to an A-pillar of the vehicle. This arm member typically is rotatably mounted to a visor housing via a bearing member. In this way, a vehicle occupant can pivot the visor housing between an upward stored position and a downward deployed position. It is also understood that the arm member can be slidably coupled to the visor housing for sliding the visor housing along the longitudinal axis of the arm member. In this way, the visor housing can be utilized for providing shade for a side window.

Existing bearing members for visor assemblies typically have holes with minimal clearance for sliding and rotating the arm members therein. For that reason, the inner surface of the bearing member can bind on the arm member when the visor housing is pivoted and/or slid along the arm member. As a result, the vehicle occupant may be required to apply substantially high and inconsistent loads for retracting and/or extracting the visor housing.

It would therefore be desirable to provide a low-friction sleeve insert for a bearing member of a visor assembly so as to improve the operation of the visor assembly while minimizing costs associated with the manufacture of the visor assembly.

SUMMARY OF THE INVENTION

In one advantageous embodiment of the claimed invention, a low-friction sleeve insert for a bearing member of a vehicle visor assembly is provided. The sleeve insert is comprised of a one-piece construction having a cylindrical portion disposed within a hole of the bearing member. The cylindrical portion has an inner surface with a substantially low coefficient of friction for sliding an arm member of the visor assembly through said one-piece construction.

One advantage of the present invention is that a low-friction sleeve insert is provided that substantially decreases an input load required from a vehicle occupant for moving the visor assembly.

Another advantage of the present invention is that a low-friction sleeve insert is provided that requires a substantially narrow range of input loads from a vehicle occupant for moving the visor assembly.

Yet another advantage of the present invention is that a low-friction sleeve insert is provided that has a substantially simple construction for minimizing manufacturing cycle time of a visor assembly, as well as costs associated therewith.

Other advantages of the present invention will become apparent when viewed in light of the detailed description of the invention when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
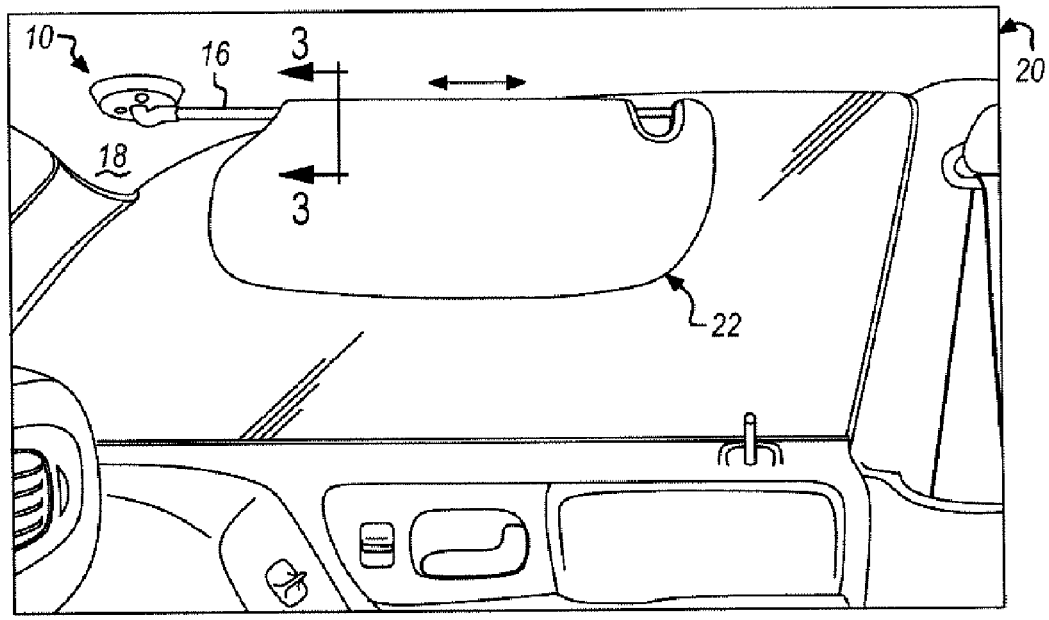
FIG. 1 is a plan view of a vehicle visor assembly having a bearing member with a low-friction sleeve insert mounted therein, according to one advantageous embodiment of the claimed invention.
Figure 3:
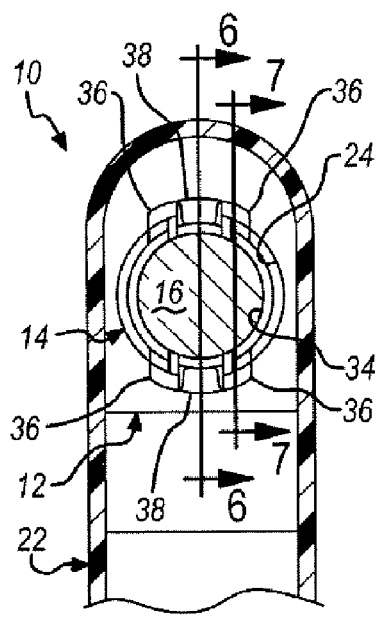
FIG. 3 is a cross-sectional view of the vehicle visor assembly shown in FIG. 1, as taken along line 3—3.
Figure 2:
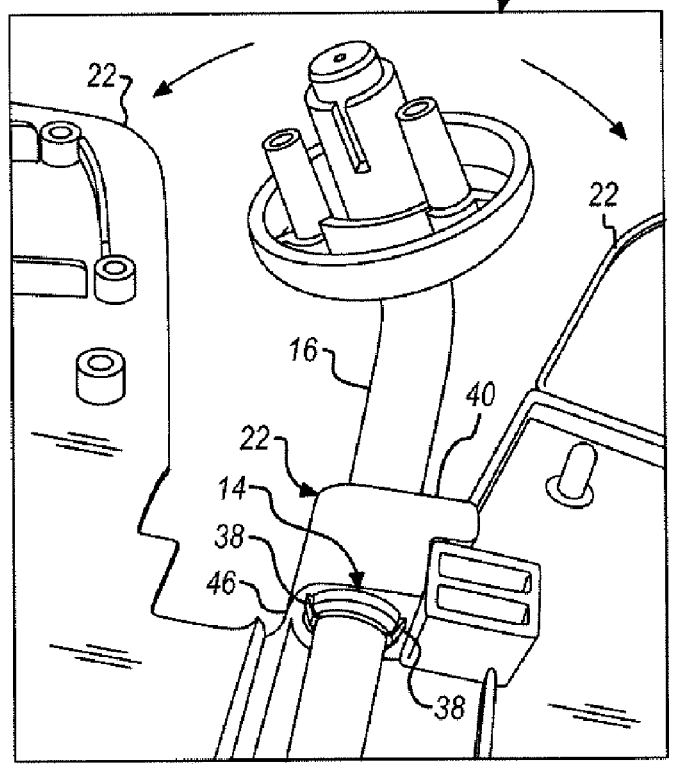
FIG. 2 is a perspective view of the vehicle visor assembly shown in FIG. 1, illustrating the vehicle visor assembly having a clam-shell housing in an open configuration with a bearing member coupled thereto.

In the following figures, the same reference numerals are used to identify the same components in the various views. Furthermore, the illustrated embodiments described herein employ features where the context permits. Specifically, the embodiments described herein implement a low-friction sleeve insert for a bearing member of a vehicle visor assembly. However, it is contemplated that the sleeve insert can instead be utilized in a variety of other suitable environments. In this regard, other embodiments are contemplated having different combinations of the described features, having features other than those described herein, or lacking one or more of those features. Thus, it is understood that the invention can be carried out in a variety of suitable modes.

Referring to FIG. 1, there is shown a plan view of a visor assembly 10 having a bearing member 12 with a low-friction sleeve insert 14 mounted therein, according to one advantageous embodiment of the claimed invention.

Specifically, the visor assembly 10 includes an arm member 16 pivotally coupled to a vehicle structure 18 adjacent to an A-pillar of a vehicle 20. However, it will be appreciated that the arm member can instead be mounted to various other suitable portions of the vehicle 20 as desired. In addition, the arm member 16 has a visor housing 22 rotatably and slidably coupled thereto. In this way, the visor housing 22 can be rotated between an upward stored position and a downward deployed position (shown in FIG. 1). Furthermore, the visor housing 22 can slid along the arm member 16 between a retracted position and an extended position (shown in FIG. 1). In this embodiment, the visor housing 22 has a clam-shell construction. However, it is understood that the visor housing 22 can instead have various other suitable constructions.

The arm member 16 is mounted to the visor housing 22 via the bearing member 12, which is coupled to and enclosed within the visor housing 22. The bearing member 12 has a hole 24 with the sleeve insert 14 mounted therein for rotating and sliding the visor housing 22 on the arm member 16.

In this embodiment, the sleeve insert 14 is comprised of a one-piece plastic construction, including a cylinder portion 26 with a first end 28 and a second 30. The cylinder portion 26 has an inner surface 32, which defines a through-hole 34 and has a substantially low coefficient of friction for minimizing the input load by a vehicle occupant for rotating and sliding the visor housing 22 along the arm member 16. Specifically, the inner surface 32 is substantially smooth and comprised of a low-friction plastic or other suitable low-friction material. This feature is beneficial utilizing substantially little input load or effort from the vehicle occupant for moving the visor housing 22.

Furthermore, the through-hole 34 is sized with a predetermined clearance for receiving the arm member 16 and having a tight fit around the diameter of the arm member 16. In that way, the sleeve insert 14 and the arm member 16 have substantially narrow friction therebetween within a substantially small range for providing a smooth and consistent feel as the vehicle occupant moves the visor assembly 10. It will be appreciated that this feature can substantially improve the comfort of the vehicle occupant and improve the product quality of the vehicle as perceived by the vehicle occupant.

Referring now to the embodiment shown in FIGS. 3–5 and 8, the sleeve insert 14 includes a series of detent flanges for securing the sleeve insert 14 to the bearing member 12. Specifically, in this embodiment, the detent flanges include four rigid protrusions 36 extending from the first end 30 of the sleeve insert 14 and two resilient snap-fit fasteners 38 extending from the second end 30 of the sleeve insert 14. However, it is contemplated that the sleeve insert 14 can be mounted within the hole 24 of the bearing member 12 by various other numbers of detent flanges, various other kinds of suitable detent flanges, various other fastening methods, or any combination thereof. For instance, also in this embodiment, the cylinder portion 26 of the sleeve insert 14 is sonically welded to the bearing member 12. Also, as exemplified in FIG. 6, the cylinder portion 26 can be insert-molded within the bearing member 12. It is contemplated that the sleeve insert 14 can instead omit the detent flanges, press-fitted within the bearing member 12, or otherwise fastened to the bearing member 12.

The resilient snap-fit fasteners 38 extend from the second end 30 of the sleeve insert 14 from opposing sides of the through hole 24. In this way, the resilient fasteners 38 are sufficiently positioned for preventing the sleeve insert 14 from being forced through the hole 24 in the bearing member 12. In addition, the rigid protrusions 36 generally extend from four opposite corners for also providing a substantial amount of support to the sleeve insert 14 and preventing the sleeve insert 14 from being forced through the hole 24 of the bearing member 12. However, it is understood that the detent flanges can instead extend from a variety of other suitable portions of the sleeve insert 14 as desired.

Figure 4:
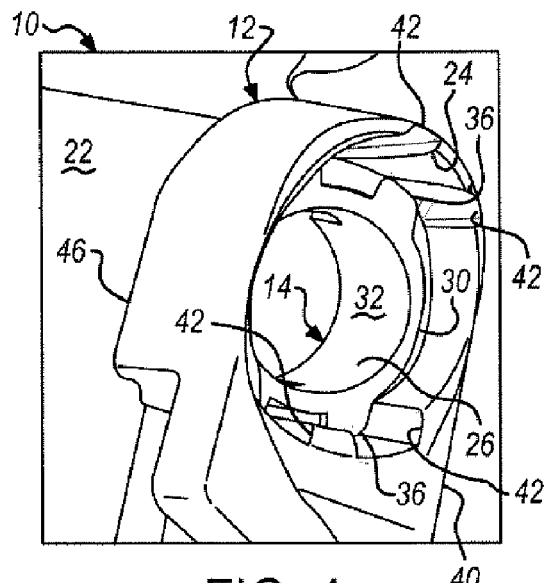
FIG. 4 is an anterior perspective view of the bearing member and the low-friction sleeve insert of the vehicle visor assembly shown in FIG. 2.
Figure 7:
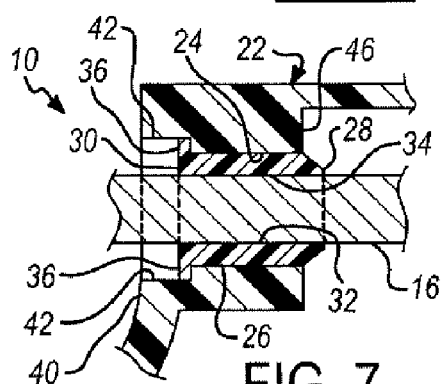
FIG. 7 is a cross-sectional view of the vehicle visor assembly shown in FIG. 3, as taken along line 7—7.
Figure 8:
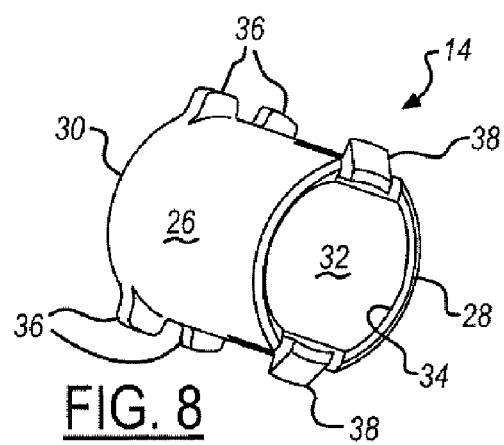
FIG. 8 is a perspective view of the low-friction sleeve insert shown in FIG. 3.

With particular attention to FIGS. 4 and 7, the bearing member 12 has a first side 40 with four grooves 42 formed therein for receiving the four rigid protrusions 36 which extend from the sleeve insert 14. These grooves 42 are utilized for positioning the sleeve insert 14 in a predetermined configuration. It will be appreciated that the bearing member 12 can include more or less than four grooves 42 as desired. In addition, as best shown in FIG. 7, the bearing member 12 includes four seat portions 44 for contacting the rigid protrusions 36 in the grooves 42 and preventing the sleeve insert 14 from passing through the hole 24 of the bearing member 12. It is understood that this feature is beneficial for positioning sleeve inserts 14, which have irregular and/or non-circular cross-sections. It will be appreciated that the grooves 42 can be omitted as desired for contacting the rigid protrusions 36 directly with the first side 40 of the bearing member 12. Also, in another embodiment, the rigid protrusions 36 can be sonically welded or heat-staked to the seat portions 44 of the bearing member 12 as desired.

Figure 5:
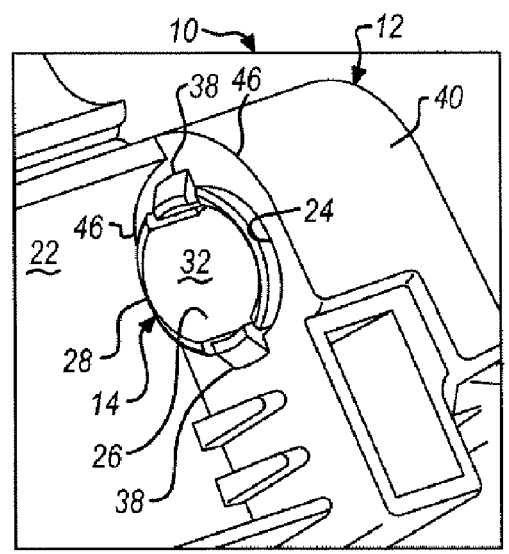
FIG. 5 is a posterior perspective view of the bearing member and the low-friction sleeve insert of the vehicle visor assembly shown in FIG. 2.
Figure 6:
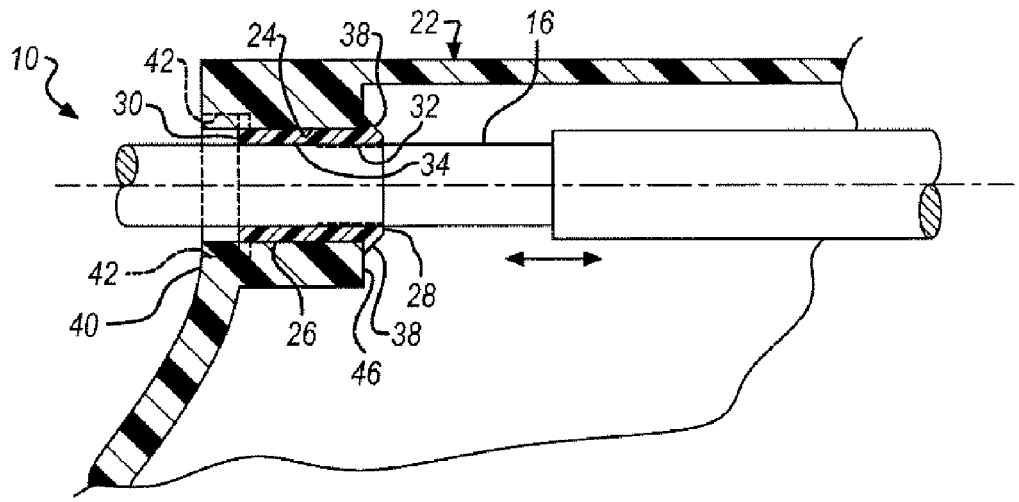
FIG. 6 is a cross-sectional view of the vehicle visor assembly shown in FIG. 3, as taken along line 6—6.

Referring now to FIGS. 5 and 6, the bearing member 12 further includes a second side 46 for contacting the resilient snap-fit fasteners 38 and preventing the sleeve insert 14 from passing through the hole 24 within the bearing member 12. In another embodiment, the second side 46 has grooves formed therein for receiving the resilient snap-fit fasteners 38 and positioning the sleeve insert 14 in a predetermined configuration as desired.

While particular embodiments of the invention have been shown and described, numerous variations and alternate embodiments will occur to those skilled in the art. Accordingly, it is intended that the invention be limited only in terms of the appended claims.

What is claimed is:

1. A low-friction sleeve insert for a visor assembly of a vehicle, comprising:
   a one-piece construction having a cylindrical portion disposed within a hole of a bearing member for the visor assembly, said cylindrical portion having an inner surface with a substantially low coefficient of friction for sliding an arm member of the visor assembly through said one-piece construction;
   said cylindrical portion at least one of insert molded within said bearing member and sonically welded to said bearing member.

2. The low-friction sleeve insert recited in claim 1 wherein said one-piece construction is comprised of a plastic material.

3. A low-friction sleeve insert for a visor assembly of a vehicle, comprising:
   a one-piece construction having a cylindrical portion disposed within a hole of a bearing member for the visor assembly, said cylindrical portion having a first end, a second end, and an inner surface extending therebetween, said inner surface having a substantially low coefficient of friction for sliding an arm member of the visor assembly thereacross;
   wherein said one-piece construction further includes at least one detent flange extending from an end portion of said cylindrical portion for engaging said bearing member.

4. The low-friction sleeve insert recited in claim 3 wherein said at least one detent flange comprises:
   at least one rigid protrusion extending from said first end of said cylindrical portion, said at least one rigid protrusion utilized for contacting at least one seat portion of said bearing member and preventing said one-piece construction from passing through said hole of said bearing member.

5. The low-friction sleeve insert recited in claim 3 wherein said at least one detent flange comprises:
   at least one rigid protrusion extending from said first end of said cylindrical portion, said at least one rigid protrusion utilized for contacting a first side of said bearing member and preventing said one-piece construction from passing through said hole of said bearing member.

6. The low-friction sleeve insert recited in claim 3 wherein said at least one detent flange comprises:
   at least one resilient snap-fit fastener extending from said second end of said cylindrical portion for contacting a seat portion of said bearing member and preventing said one-piece construction from passing through said hole of said bearing member.

7. The low-friction sleeve insert recited in claim 3 wherein said at least one resilient snap-fit fastener extending from said second end of said cylindrical portion for contacting at least one second side of said bearing member and preventing said one-piece construction from passing through said hole of said bearing member.

8. The low-friction sleeve insert recited in claim 3 wherein said cylindrical portion is insert molded within said bearing member.

9. The low-friction sleeve insert recited in claim 3 wherein said cylindrical portion is sonically welded to said bearing member.

10. The low-friction sleeve insert recited in claim 3 wherein said one-piece construction is comprised of a plastic material.

11. A visor assembly for a vehicle, comprising:
   a visor housing;
   a bearing member coupled to and enclosed within said visor housing;
   said bearing member having a hole formed therethrough;
   a low-friction sleeve insert coupled to said bearing member within said hole of said bearing member;
   said low-friction sleeve insert having a one-piece construction with a cylindrical portion and at least one detent flange extending from an end portion of said cylindrical portion;
   said cylindrical portion disposed within said hole of said bearing member;
   said cylindrical portion having an inner surface with a substantially low coefficient of friction;
   said at least one detent flange engaging said bearing member; and
   an arm member disposed within said low-friction sleeve insert for rotatably and slidably coupling said arm member to said bearing member.

12. The low-friction sleeve insert recited in claim 11 wherein said at least one detent flange comprises:
   at least one rigid protrusion extending from said end of said cylindrical portion, said at least one rigid protrusion utilized for contacting at least one seat portion of said bearing member and preventing said one-piece construction from passing through said hole of said bearing member.

13. The low-friction sleeve insert recited in claim 11 wherein said at least one detent flange comprises:
   at least one rigid protrusion extending from said end of said cylindrical portion, said at least one rigid protrusion utilized for contacting a first side of said bearing member and preventing said one-piece construction from passing through said hole of said bearing member.

14. The low-friction sleeve insert recited in claim 11 wherein said at least one detent flange comprises:
   at least one resilient snap-fit fastener extending from said end of said cylindrical portion for contacting at least one seat portion of said bearing member and preventing said one-piece construction from passing through said hole of said bearing member.

15. The low-friction sleeve insert recited in claim 11 wherein said at least one resilient snap-fit fastener extending from said end of said cylindrical portion for contacting a second side of said bearing member and preventing said one-piece construction from passing through said hole of said bearing member.

16. The low-friction sleeve insert recited in claim 11 wherein said cylindrical portion is insert molded within said bearing member.

17. The low-friction sleeve insert recited in claim 11 wherein said cylindrical portion is sonically welded to said bearing member.

* * * * *